United States Patent [19]
Brewster et al.

[11] Patent Number: 6,041,108
[45] Date of Patent: Mar. 21, 2000

[54] METHOD AND APPARATUS FOR INTELLIGENT NETWORK CALL HANDLING IN A TELEPHONE EXCHANGE

[75] Inventors: John Brewster, Middletown; Mehmet Ulema, Redo Bank, both of N.J.

[73] Assignee: Daewoo Telecom, Ltd., Inchon, Rep. of Korea

[21] Appl. No.: 08/868,459

[22] Filed: Jun. 3, 1997

[51] Int. Cl.⁷ .................................................. H04M 3/00
[52] U.S. Cl. .......................... 379/196; 379/188; 379/201
[58] Field of Search ..................................... 379/188, 189, 379/196, 197, 198, 201, 207, 219, 220, 210, 211, 222, 279

[56] References Cited

U.S. PATENT DOCUMENTS

| | | | |
|---|---|---|---|
| 4,827,500 | 2/1989 | Binkerd et al. | 379/220 |
| 4,924,510 | 5/1990 | Le | 379/201 |
| 5,276,731 | 1/1994 | Arbel et al. | 379/201 |
| 5,357,564 | 10/1994 | Gupta et al. | 379/112 |
| 5,467,388 | 11/1995 | Redd, Jr. et al. | 379/201 |
| 5,497,414 | 3/1996 | Bartholomew | 379/201 |
| 5,513,255 | 4/1996 | Yoo et al. | 379/279 |
| 5,680,446 | 10/1997 | Fleischer, III et al. | 379/197 |
| 5,802,157 | 9/1998 | Clarke et al. | 379/196 |

*Primary Examiner*—Krista Zele
*Assistant Examiner*—Benny Q. Tieu
*Attorney, Agent, or Firm*—Stroock & Stroock & Lavan LLP

[57] ABSTRACT

A method and apparatus for operating on intelligent network calls in a telephone exchange with multiple access subsystems and an interconnection subsystem is provided. A list of intelligent network criteria is stored in each access subsystem. When an incoming call is received the access subsystem determines whether the incoming call matches one of the intelligent network criteria stored in the access subsystem. If a match occurs the access subsystem performs an intelligent network function. Intelligent network function may include filtering the call. If filtering is to occur a filtering method associated with the matched active filtering criteria is applied to determine whether a call should be blocked as a function of the filtering method.

24 Claims, 6 Drawing Sheets

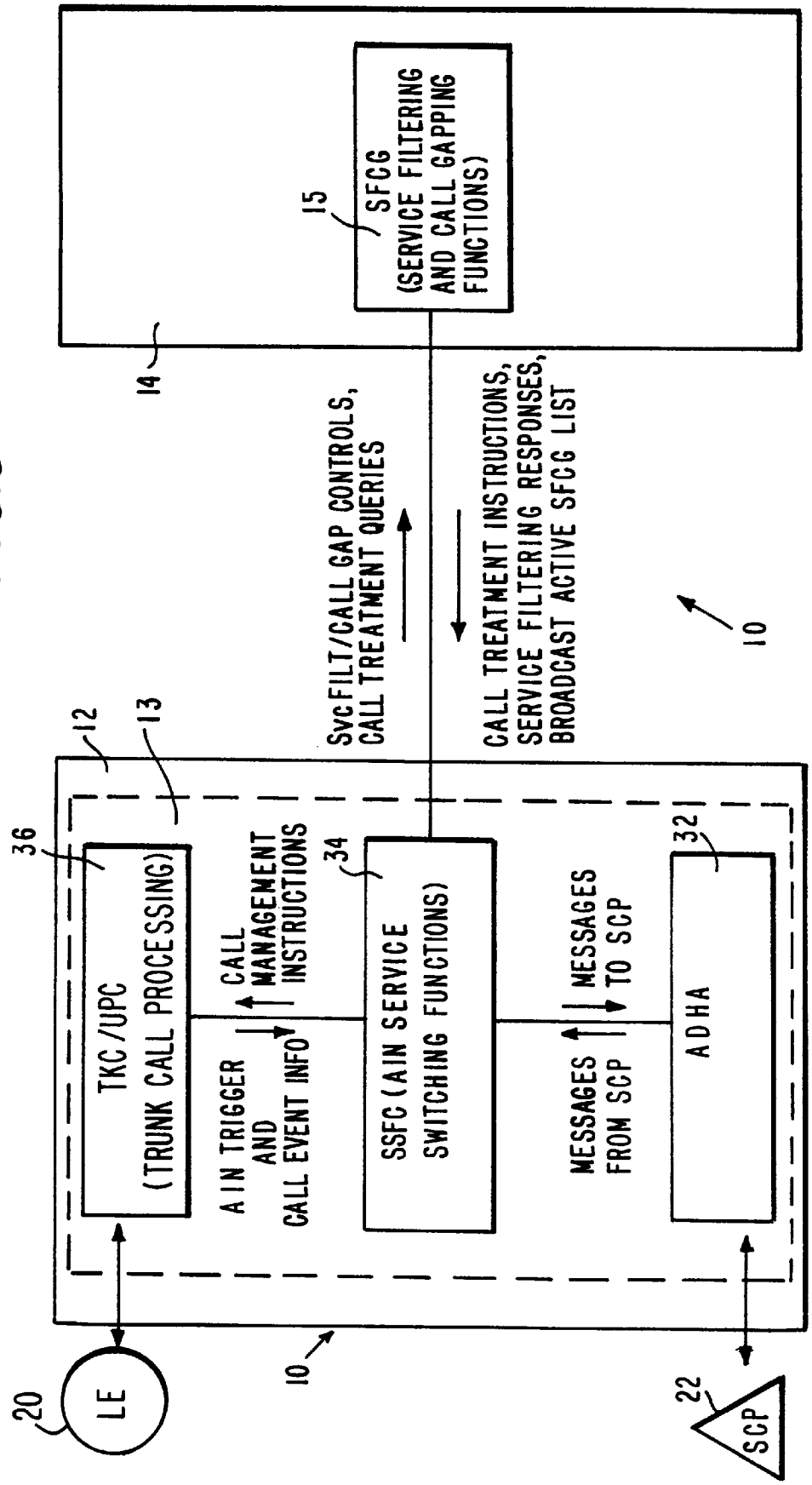

METHOD AND APPARATUS FOR INTELLIGENT NETWORK CALL HANDLING IN A TELEPHONE EXCHANGE

BACKGROUND OF THE INVENTION

This invention is directed to a method and apparatus for processing intelligent network calls within a telephone switching system in an exchange, and in particular, to a method and apparatus for operating an access subsystem and interconnection subsystem within the switching system to more efficiently filter calls and control traffic load.

An intelligent network based switching system architecture offers greater flexibility to the telephone service providers to design, implement and market new services in a relatively short time.

In addition, certain types of telephone customers, such as, companies running telephone call-in contests, certain 1-800 numbers or even certain central office codes within densely populated areas receive more telephone calls (load) than others, or more than is desirable for the efficient operation of the overall telephone switching system responsible for directing calls to these particular numbers. To protect the telephone network from congestion due to overload or failure conditions, it is known in the art to utilize call filtering techniques. Filtering may be applied on a system wide basis, or telephone companies may also offer services that allow particular subscribers to have filtering applied to their incoming calls.

Conventional telephone switching systems achieve high performance and economic design by using a system architecture as shown in FIG. 1, that includes modular access subsystems that contain switching elements, network interface elements, and other hardware and software for routing incoming calls to desired subscribers. A switching system 10 may include a plurality of access subsystems 12 (1-N) to support all the lines and trunks served by the telephone exchange. The access subsystems also include software controlled processors 13 that provide call processing and management functions for the subsystem. The telephone switch system 10 within the exchange may also include an interconnection subsystem 14 operatively coupled to the N access subsystems 12 to provide connectivity between the individual access subsystems and to provide certain overall management functions, such as fault management. Interconnection subsystem 14 also includes a processor 15 for processing of calls and performing management functions.

The switching system described above utilizes filtering functions which are best suited for us in an intelligent network as shown in FIG. 5. An intelligent network allows a switch to directly operate on a call. Different tasks associated with an incoming call may be done by different parts of the intelligent network. Intelligent networks calls require processing and are designed to be processed at least minimally by the switching system 10. Non-intelligent network calls may be handled entirely at the local exchange. In the intelligent network, a plurality of switching systems 10 will be associated with a service control point (SCP) 22. Conventionally, the service control point communicates with the access subsystems 12 of base switching system 10 to provide service control functions to the switching system 10. This allows switching system 10 to focus on service switching rather than the service control process. In the prior art, when a call arrives switching system 10 first analyzes the digit to determine whether this call is an intelligent networking type of call. Digits such as 1-800, 1-900 or 0 usually signal an intelligent network call. For example, dialing 0 may result in an automated response from an operator determining whether incoming call is to be a calling card call, a collect call, a person to person call or the like. If the switching system 10 determines that the incoming call is an intelligent network call it forwards the call to SCP 22 to determine what specific actions it should take. SCP 22 instructs the switch and/or other intelligent network elements known as intelligent peripherals regarding the necessary actions to be taken. Intelligent peripherals may include the voice activated responses for an automated operator to prompt the caller to take the necessary action at their end; such as dialing the calling card number and PIN number.

In an intelligent network it becomes critical that the switching system spend as little time as possible in a given call and immediately interact with the SCP to handle the call. One method known in the art for implementing the intelligent network functions in a switching system constructed as in switching system 10 is to centralize the intelligent networking functions in interconnection subsystem 14. As the intelligent networking inquiries are similar in operation to the filtering activities as discussed above and in fact, the filtering process discussed above may in fact be considered a subset of the intelligent network functions operation on intelligent network calls may be handled in a generally similar way. Accordingly, upon receipt of an incoming call, the access subsystem 12 would send a query to the interconnection subsystem 14 for each incoming call to determine whether the call should be treated as an intelligent networking call. The information subsystem would analyze the call by comparing the digits in the call to a list of intelligent network matching criteria to determine whether the incoming call is an intelligent network call. If it is determined that a match has occurred and an intelligent network call is present, the interconnection subsystem 14 determines the type of intelligent network call and sends this information to SCP 22. SCP 22 will then return information regarding processing of this call. As with filtering, although this process centralizes the function of processing intelligent network calls, it overloads one portion of switching system 10 causing a bottle neck at interconnection subsystem 14.

Call filtering is a selective acceptance of calls that meet specific filtering criteria. Filtering criteria typically include a number of digits that are compared to the called number. Selective acceptance of calls that meet the filtering criteria may be done by a number of methods, the most common of which are interval-based filtering or ratio based filtering. By way of example, for interval based calling for controlling the load to a highly called exchange, the switching system should accept only a specified number of the calls that meet the filtering criteria, i.e., match the filtered number, during each interval of a specified duration; such as one call per second. For ratio based call filtering or absolute number call filtering, the switching system within the exchange accepts only a specified ratio of the calls that meet the filtering criteria such as one call out of every four or only the first ten callers. Such a filtering criteria is particularly useful in a situation in which a particular subscriber may be running a telephone contest such as the first ten callers to a radio station. If a call is not passed by the exchange, it is blocked and the caller typically hears a tone indicating busy or an announcement.

To implement filtering, it is known in the art to centralize the filtering function in interconnection subsystem 14. A library of filtering criteria is stored in interconnection subsystem 14. An incoming call is received by the access subsystem 12. The access subsystem 12 sends a query to interconnection subsystem 14 for each incoming call attempt Interconnection subsystem 14 would then compare the incoming call to a list of numbers to be filtered (filtering criteria) such as a specific number for a mass call-in or specific types of 1-800 numbers or area codes. If it was determined that the number was the type subject to filtering, interconnection subsystem 14 would then determine whether or not this was the Nth call for that particular number and then make a determination whether or not this particular incoming call should be blocked either by the interval based call filtering or the ratio based call filtering method. Interconnection subsystem 14 also makes a count of the incoming calls matching a particular criteria so that it may determine whether or not the next call should be blocked according to the associated filtering methods.

The determination of interconnection subsystem 14 regarding whether the call is to be passed or blocked is then transmitted to access subsystem 12 and access subsystem 12 either blocks or passes the call in response to the instructions from interconnection subsystem 14.

This method has been satisfactory. However, putting the entire filtering function in interconnection subsystem 14, slows down the overall operation of the system because of the necessity to query interconnection subsystem 14 for each and every call whether filtering applies or not. This turns interconnection subsystem 14 into a bottle neck for the overall exchange. The effect is to slow down the exchange to such an extent that the system may crash. Accordingly, it is desired to provide a method for filtering calls in a telephone exchange which overcomes the shortcomings of the prior art.

Accordingly, it is also desired to provide a structure and method for operating an intelligent network which overcomes the shortcomings of the prior art.

SUMMARY OF THE INVENTION

Generally speaking, in accordance with the instant invention, a network for processing incoming telephone calls includes a switching system, the switching system includes at least two access subsystem operatively coupled to an interconnection subsystem. Intelligent network information is stored in each of the access subsystems, the access subsystem receiving an incoming call comparing it to the stored intelligent network information and operating on the incoming call based upon a match between the intelligent network information and the incoming call. Intelligent network information may include filtering criteria and its associated filtering methods.

In an exemplary embodiment, the interconnection subsystem also stores active filtering criteria and receives changes to the active filter criteria, the interconnection subsystem broadcasting changes to the active filter criteria to each of the access subsystems, the access subsystems storing the revisions to the active filter criteria A method for filtering calls in a switch, includes the step of storing a list of active filter criteria in each of the at least one access subsystems. A call is received by a respective one of the access subsystems. The access subsystem compares the incoming call to the list of active filter criteria to determine whether there is a match between the incoming call and any of the filter criteria on the list to determine whether a filtering method is to be applied to the call. If the call does not match any of the active filter criteria the call is passed. If the call matches one of the active filter criteria, then an associated method of filtering is applied to the incoming call and the call is either blocked or passed as a function of the selected method of filtering. A count is maintained for the number of times a call matches a particular active filter criteria In a preferred embodiment, the method for filtering may be one of interval based call filtering or ratio based call filtering. Additionally, the list of filtering criteria or filtering method may be changed.

In another preferred embodiment of the invention, the list of active filter criteria is stored in the interconnection subsystem. The list of active filtering criteria is also stored in the interconnection subsystem. The list of active filter criteria is broadcast from the interconnection subsystem to the access subsystems each time the list of active filter criteria is revised. The revised list of active filter criteria is stored in the access subsystem. The access subsystem receives an incoming call and compares the incoming call to the active list of criteria and determines whether the incoming call matches any of the active filtering criteria on the list. If there is no match then the call is passed to the customer. If there is a match between the incoming call and the list of active filtering criteria, the access subsystem notifies the interconnection subsystem of the incoming call. The interconnection subsystem applies a filtering method to the incoming call and determines, based upon the filtering method employed, to accept or block the call. The interconnection subsystem instructs the access subsystem to accept or block the call in response to the determination of the interconnection subsystem, the access subsystem accepting or blocking the call in accordance with the instructions. At the same time, the interconnection subsystem increments a counter associated with the matching of a particular active filtering criteria.

Accordingly, it is an object of the instant invention to provide an improved filtering method.

A further object of the invention is to provide a filtering method which alleviates the bottleneck associated with the use of interconnection subsystems within a switching system.

Another object of the instant invention is to provide uniformity in the treatment of incoming calls while simplifying the process of collecting statistical information on filtering activity.

Still other objects and advantages of the invention will in part be obvious and in part be apparent from the specification.

The invention accordingly comprises the several steps in relation of one or more of such steps with respect to each of the others thereof, will be exemplified in the method hereinafter disclosed, and the scope of the invention will be indicated in the claims.

BRIEF DESCRIPTION OF THE DRAWINGS

For a fuller understanding of the invention reference is had to the following description taken in connection with the accompanying drawings, in which:

FIG. 6 is a detailed block diagram of the switching system operated in accordance with the second embodiment of the invention.

DETAILED DESCRIPTION OF THE PREFERRED EMBODIMENTS

Figure 1:
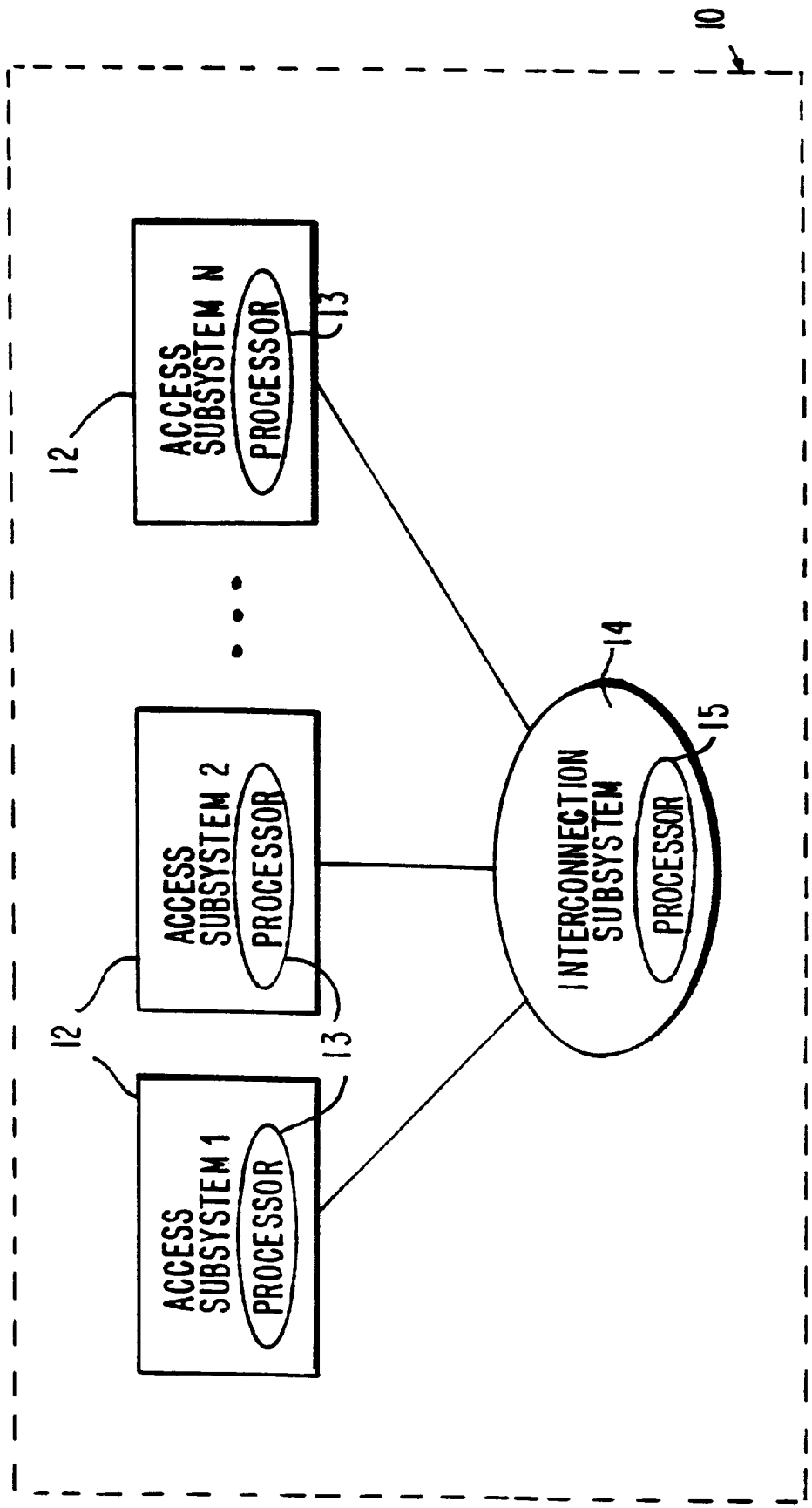
FIG. 1 is a schematic view of a switch system constructed in accordance with the prior art.
Figure 2:
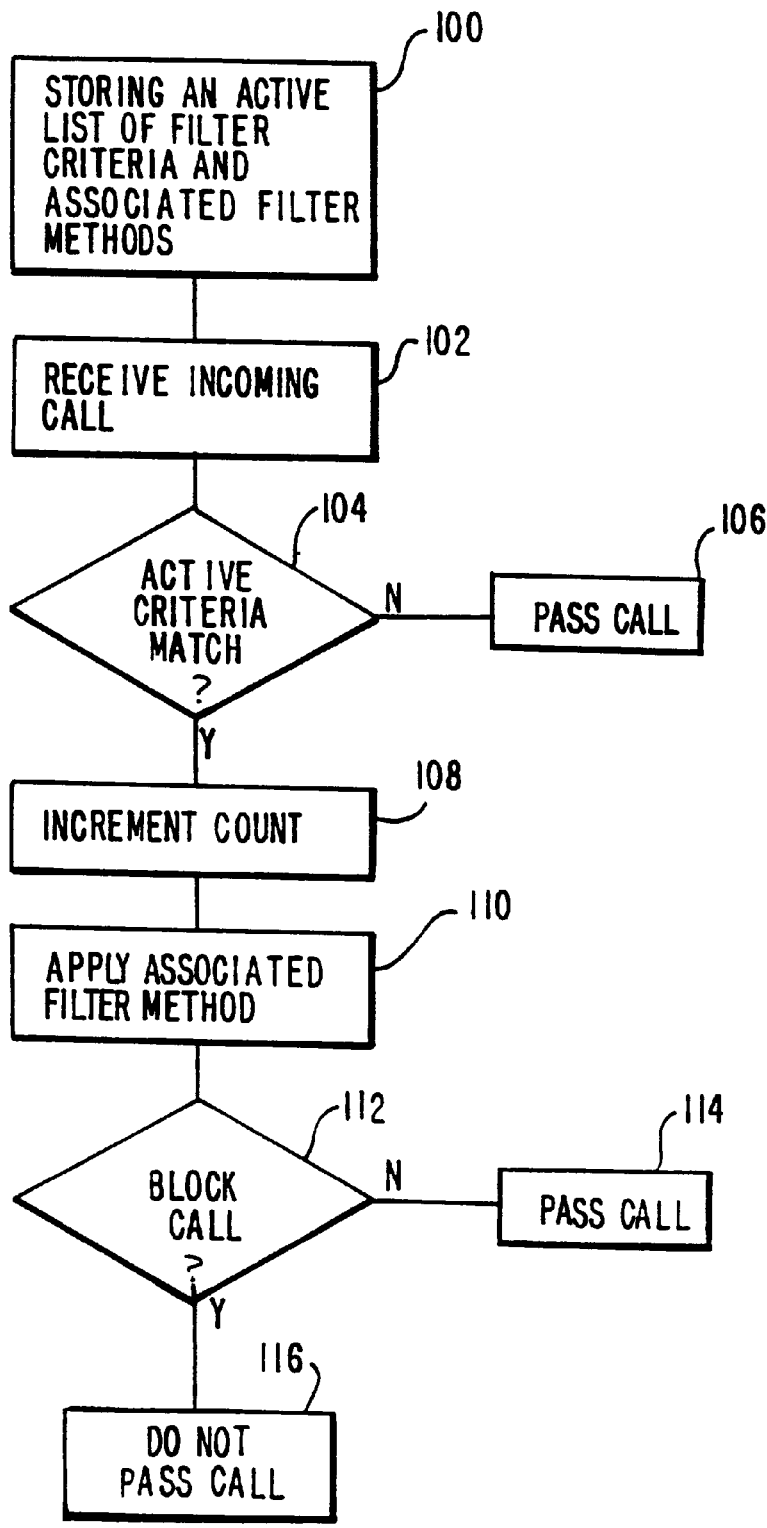
FIG. 2 is a flow chart for performing filtering in the switch system in accordance with a first embodiment of the present invention.

Reference is made to FIGS. 1 and 2 in which a first method for operating switching system 10 in accordance with the invention is provided. Generally, switching system 10 includes at least one access subsystem 12. Each access subsystem 12 includes a processor 13 therein. Each access subsystem 12 is operatively coupled to an interconnection subsystem 14 having its own processor 15 therein. Incoming calls are received by a respective one of the N access subsystems 12.

A list of active filter criteria is stored in each of access subsystems 12. The list of active filter criteria corresponds to those numbers for which filtering methods should be applied. For example, the list may include the call number for a particular customer such as a radio station running a telephone contest; a particular number such as a 1-800 number or heavily dialed central office code in a particular geographic area; or a group of numbers grouped together by a particular service, such as, astrology numbers, sports telephone numbers or the like. A filtering method such as ratio based filtering or interval based filtering is stored in the access subsystem and is associated with respective filter criteria on the stored list. In accordance with a step 100 an active list of filter criteria and associated filter methods is stored in each access subsystem 12. An incoming call is received by a respective access subsystem 12 in a step 102. The access subsystem compares the incoming call to the list of active filter criteria and determines whether a match has occurred in a step 104. Processor 13 keeps a count as to the number of times each criteria is matched. If no match occurs then the call is passed to the subscriber in a step 106.

If a match is found between the incoming call and one of the active filter criteria, then in step 108 access subsystem 12 increments the count of the number of matches for the particular active criteria found to be a match. In step 110, access subsystem 12 applies the associated filter method to the incoming call. This filter method may be the interval based call filtering method as discussed above or the ratio based call filtering method or some other call based filtering method. It is determined in step 112 whether to block the call in accordance with the filtering method. If the call is not blocked then the call is passed in accordance with a step 114. If the call is to be blocked then the call is not allowed to pass and the caller will receive an instruction or a busy signal in accordance with a step 116.

In an example, if the call in question corresponds to a heavily trafficked 1-800 service, which is subject to filtering, then access subsystem 12 receives the incoming 1-800 number in step 102. In step 104, access subsystem 12 compares the 1-800 number to the list of active filter criteria and determines that this particular 1-800 number is on the list in step 104. In step 108 the count corresponding to this particular 1-800 number is incremented. An associated filter method is applied in step 110. Knowing the count from processor 13 it is easily determined whether this is the Nth call for a particular criteria If this is the Nth call received within a five second call period, and the associated filtering method is to allow no more than N-1 calls within a five second period then the call will be blocked in steps 112 and 116. If this call is the Nth call and the filtering method is to pass the first N calls, then in step 112 it will be determined not to block the call and the call will be passed onto the subscriber in step 114. If the ratio base call filtering method is associated with the active filtering criteria for this particular number, and every Nth call is being passed, then this call would be passed in step 112 and would be passed in step 114.

By providing the entire filtering process in access subsystem 12, there is no longer a need to query interconnection subsystem 14. This speeds the filtering process in the entire switching process while preventing bottlenecks at the interconnection subsystem. However, without the management operation of the interconnection subsystem 12, there is no assurance of an even level of filtering across the entire switching system 10. For example, in an interval based filtering method a heavily loaded access subsystem 12 (1) may block a different percentage of its calls than lightly loaded access subsystem 12 (N). Further, distributing filtering among access subsystems 12 does not provide a method to assure that interval based call filtering yields an even flow of accepted calls when looked at as the entire switching system 10. By way of example, if a switching system with ten access subsystems 12 is required to accept one call per second for a specific filtering criteria, each access subsystem could be instructed to accept one call every ten seconds. However, without an elaborate synchronization scheme, the access subsystem 12 would inevitably block and accept calls in a non-uniform manner from the total system perspective i.e. no calls would be accepted in some intervals and two or more calls would be accepted in others.

Figure 3:
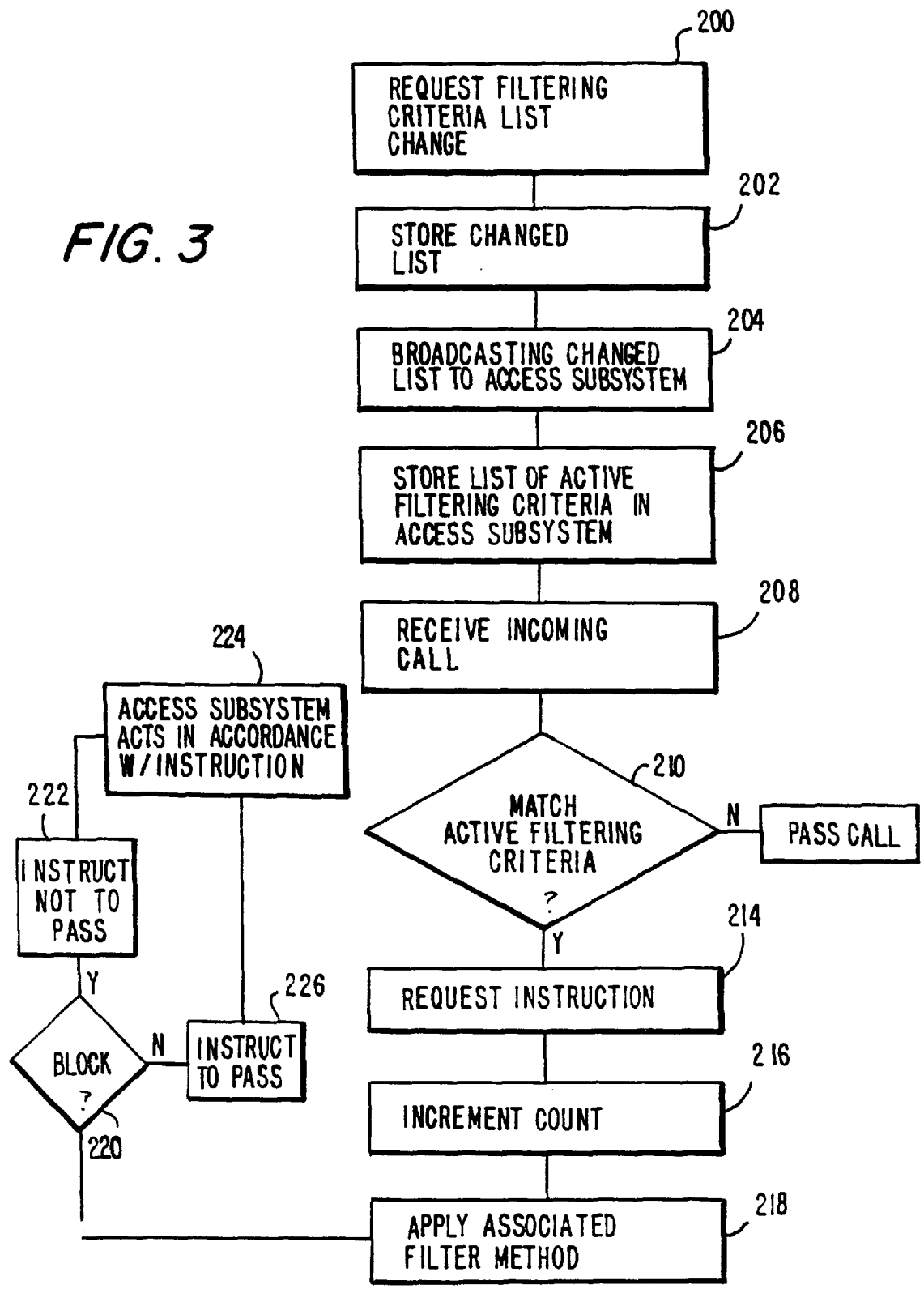
FIG. 3 is a flow chart of a method for performing filtering in the switching system in accordance with a second embodiment of the invention.
Figure 4:
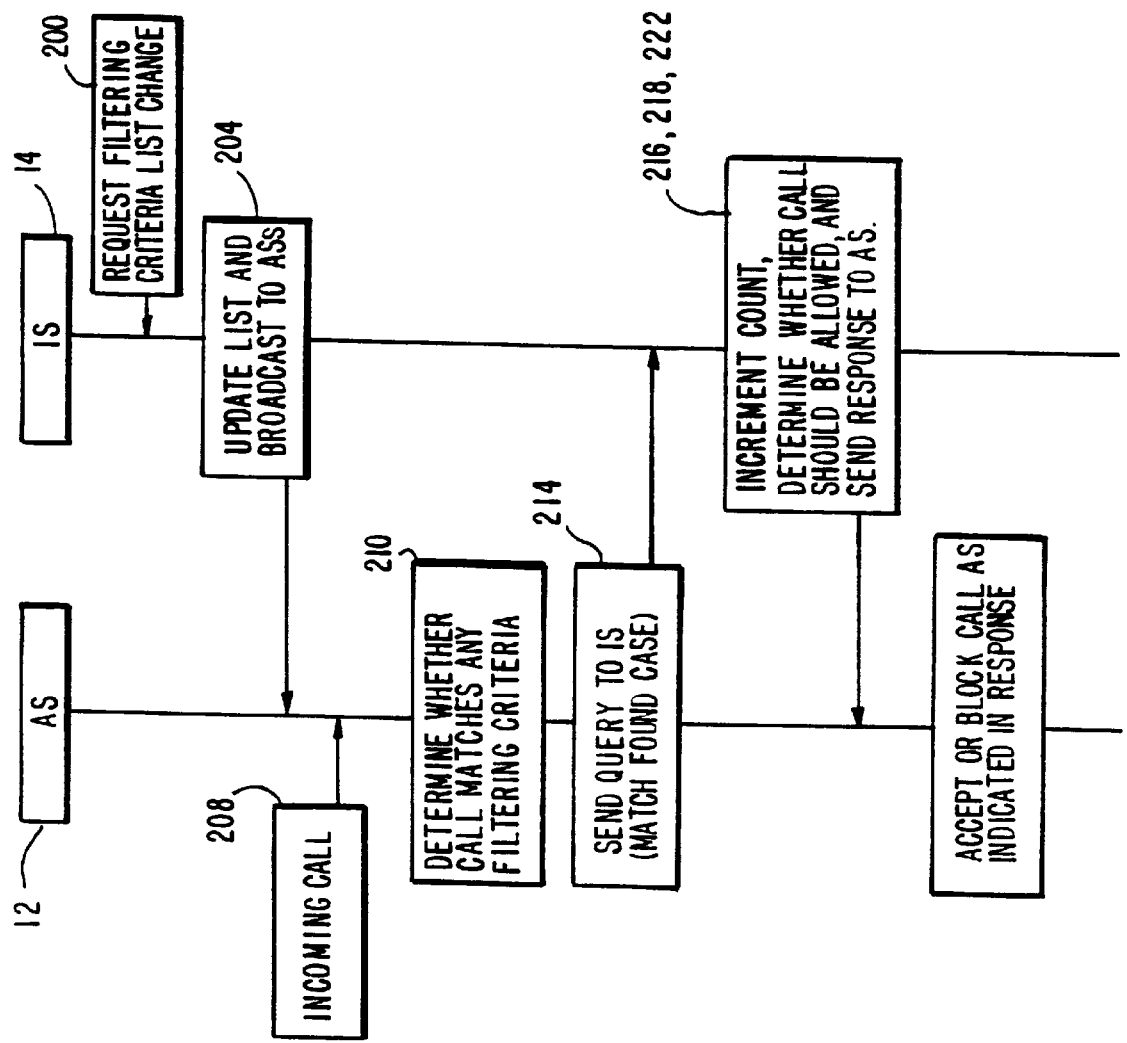
FIG. 4 is an operational diagram illustrating which general method steps are performed by which structure in the switch system in accordance with the second embodiment of the invention.

Reference is now made to FIGS. 3 and 4 in which a method for operating switching system 10 which overcomes some of the fairness problems of the method if FIG. 2 while overcoming the bottleneck problems of the prior art is described. FIG. 4 corresponds to an operational depiction of the division of tasks between the access subsystem and interconnection subsystem of the method operations illustrated in the flow chart of FIG. 3. Like numbers are utilized to identify like structures and corresponding method steps.

A request to change the active filtering criteria list is input to interconnection subsystem 14 in accordance with a step 200. At the initialization of the system, the request would take the form of inputting the initial active filtering criteria list. The active criteria list is stored in interconnection subsystem 14 in accordance with a step 202. The request for a change in the active filtering criteria list may come as an input request from a subscriber who wishes to change what is filtered to their particular number, or may be an automated process which monitors the load to a particular number or exchange and will change the active criteria list accordingly to prevent system overload. The changed active criteria list is then broadcast to each access subsystem 12(1-N). The active list of filtering criteria is stored in the access subsystem 12 in step 206.

An incoming call is received by access subsystem 12 in step 208. Processor 13 of access subsystem 12 determines whether the incoming call matches any of the active filtering criteria stored in access subsystem 12 in a step 210. If there is no match then the call is passed to the customer in a step 212. If there is a match then access subsystem 12 transmits the type of filter criteria matched and requests instructions from interconnection subsystem 14 on whether to pass the call or not in a step 214.

In a step 216, processor 15 of interconnection subsystem 14 increments a count associated with the active filtering criteria corresponding to the incoming call. In a step 218, interconnection subsystem 14, utilizing processor 15, applies the filter method associated with the matched filter criteria and in step 220 determines whether the incoming call is to be blocked. If processor 15 determines that the call is to be blocked, then interconnection subsystem 14 outputs instructions to access subsystem 12 that the received call is not to pass in accordance with a step 222. Access subsystem 12, acting in accordance with the instructions from interconnection subsystem 14 does not pass the call in accordance with a step 224. Similarly, if it is determined in step 220 to pass the call then interconnection subsystem 14 instructs access subsystem 12 to pass the call in a step 226 and access subsystem 12 acting in accordance with the instructions from interconnection subsystem 14 passes the call in a step 224.

As with the method of FIG. 2 the filtering criteria corresponds to the call number which is to be operated upon with a particular filtering method. As before, this may correspond to a particular central office code, a particular subscriber, or particular types of services. In operation, in accordance with the preferred embodiment of the invention, if a customer wishes for their particular number to be subject to filtering, they would request that filtering be applied and determine the type of filtering to be applied. This request to be added to the active filtering criteria list would be input to the interconnection subsystem 14 in accordance with steps 200, 202. The addition to the list would be broadcast and stored in the access subsystem 12 in accordance with steps 204, 206. When a call is received by access subsystem 12, it would determine whether that particular call number matched one of the active filtering criteria in a step 210. Access subsystem 12 would request instruction from interconnection subsystem 14 and transfer the information regarding the call to interconnection subsystem 14. Processor 15 of interconnection subsystem 14 would increment the count of received calls corresponding to the matched filtering criteria in step 216 and apply the associated filtering method to determine whether or not to block the call in steps 218, 220.

In a preferred embodiment, access subsystem 12 transmits the actual incoming call number to intercom subsystem 12. However, it is contemplated that access subsystem 12 might transmit only the filter criteria matched or other information which enables interconnection subsystem 14 to apply the appropriate method.

Again, if the filtering criteria is to pass calls 1-N, then the Nth call should not be blocked as determined in step 220 and an instruction to pass the call in step 226 would be transmitted to the access subsystem 12 which has received the call. The access subsystem 12 acting in accordance with the instructions would pass the call in a step 224. Similarly, if the filtering method was to only allow N calls per every five seconds the call would be passed in accordance with steps 218–226. However, if filtering was to occur based upon a ratio based filtering method and only every Nth call were to be passed then it would be determined to pass this incoming call in step 220 and instructions not to pass the call would be transmitted to the particular access subsystem 12 in step 226 and the call would be passed in accordance with the instructions from the interconnection subsystem 14 and step 224. In either embodiment of the invention more than one filtering method may be stored and a particular method may be associated with all or a portion of the active filtering criteria.

Figure 5:
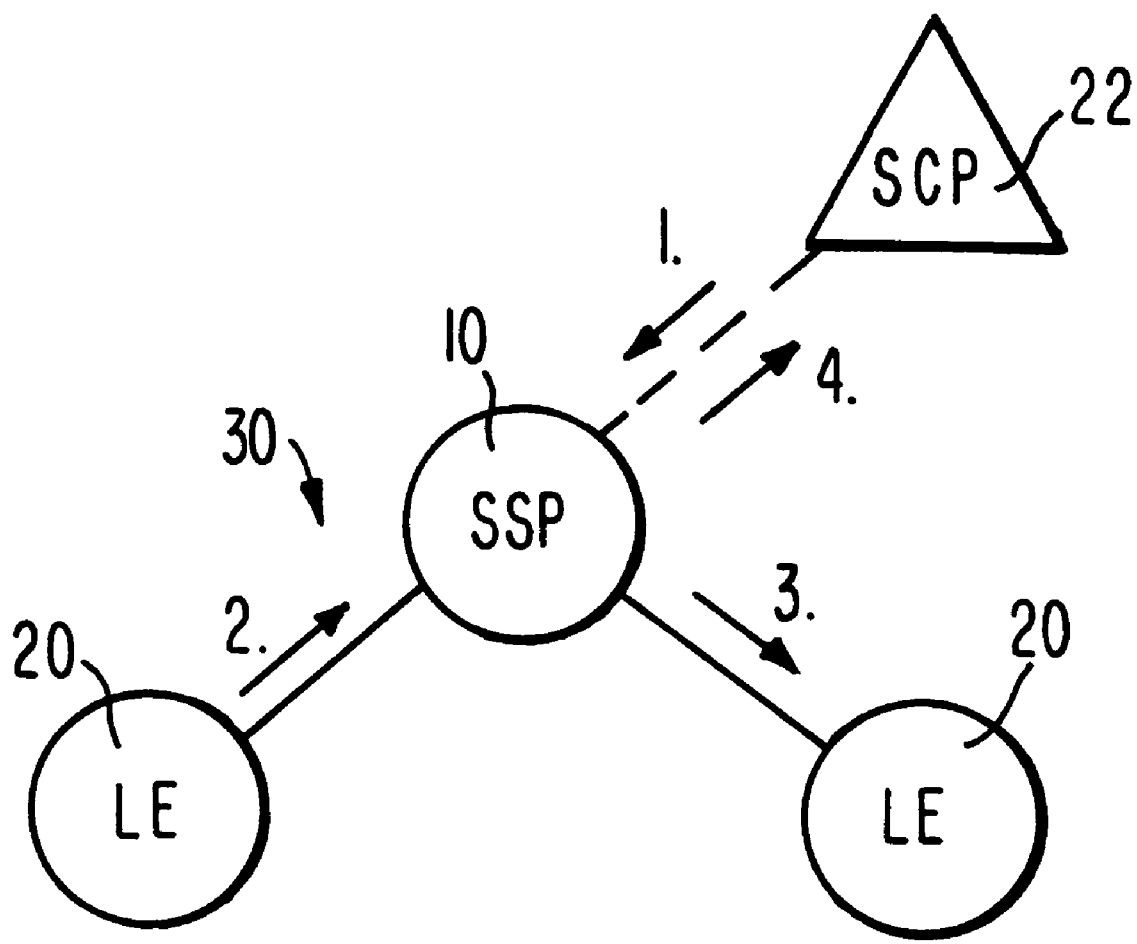
FIG. 5 is a block diagram of an intelligent network architecture containing the switch system as operated in accordance with either embodiment of the invention.

Reference is now made to FIGS. 5 and 6 in which a more detailed description of how the filtering method operates within an intelligent network architecture in accordance with the invention. A network 30 includes a plurality of local exchanges 20 which either receive incoming calls or direct outgoing calls to telephone equipment and specific numbers. Local exchanges 20 are connected to switch 10 (SSP). SSP 10 includes the access subsystem 12 and interconnection subsystem 14. It should be understood that a plurality of switching systems 10 may be provided with an exchange, each being connected to a plurality of local exchanges 20, however only a single switching system 10 is shown in network 30 for simplicity of description. A service control point (SCP) 22 is connected to a plurality of SSP 10 and as will be discussed in greater detail below receives information regarding the number and nature of calls operated upon by SSP 10 and inputs intelligent networking functions such as interaction with intelligent peripherals or the filtering criteria and methods to SSP 10. Additionally, filtering criteria and filtering information methods may be input to switch system 10 manually at switch system 10.

Reference is now made specifically to FIG. 6, in which switch system 10 is described in greater detail. As discussed above, switch system 10 includes access subsystem 12 containing a processor 13. Within processor 13 is an Advanced Data Handling Application (ADHA) 32 which is operatively coupled and in communication with a Service Switching Function Control (SSFC) 34. ADHA 32 couples access subsystem 12 to SCP 22. SSFC 34 is operatively coupled and in communication with a trunk call processor (TKC/UPC) 36. Trunk call processor 36 receives and transmits incoming calls from local exchanges. It is SSFC 34 which communicates with interconnection subsystem 14. Interconnection subsystem 14 includes processor 15 which performs service filtering and call gaping functions as described above in connection with the embodiment of the invention.

To determine the type of handling (intelligent network function versus non-intelligent network function), a call type identification occurs. Therefore, intelligent network call information (criteria) is stored in the trunk call processor 36. By way of example, where some specific 1-800 numbers would require intelligent network handling, because 1-800 numbers are particularly viable candidates for intelligent network functions, information for making an initial identification of 1-800 numbers, in general, would be stored in trunk call processor 36. Furthermore, specific numbers which require intelligent network handling, such as numbers which are to be filtered in service switching function control 34, would also be stored in trunk call processor 36. This first screen is used to trigger filtering performed by interconnection subsystem 14 or other intelligent network handling as instructed by SCP 22.

Intelligent networking functions are implemented by SCP 22 and by each access subsystem 12 in respective switching system 10. Access subsystems 12 communicates with SCP 22 when incoming calls received by the access subsystem require special instruction for handling. Access subsystem 12 determines whether the incoming call is an intelligent network call. This is done by comparing the first few digits of the incoming call number with a criteria for intelligent network calls, by way of example 1-800, 1-900, or 0 are the most common although any digits may be used to signal intelligent network handling. If it is not an intelligent network call then the call is handled by the non-intelligent call processing functions in switching system 10. If it is an intelligent network call, then access subsystem 14 sends a query to SCP 22 by sending the received number to SCP 22. SCP 22 processes the call and determines what type of function should be provided at switch system 10 and whether intelligent peripherals are required to process the call. SCP 22 then provides instructions to access subsystem 12 on how to operate on the call. The instructions may be routing a call to a specific local exchange, sending a prerecorded message to the caller, or the like. One intelligent networking implementation may be filtering the call.

To set the parameters for filtering calls, SCP 22 transmits filter criteria and associated filtering method to SSP 10. The filtering information is received at ADHA 32 of a particular access subsystem 12 within switch system 10. ADHA 32 transmits this filtering information to SSFC 34. This information includes service filtering information and call gap controls. Call gap controls are filtering criteria directed to control the load of the overall monitoring system which will be discussed in detail below. The service filtering and call gaping function within processor 15 determines whether this filtering information is an update of already stored information or whether it is new information to be added to the filter criteria and associated filter methods already stored in interconnection subsystem 14. The service filtering control then updates the stored list of the interconnection subsystem and causes the interconnection subsystem to broadcast the revised filtering criteria to each access subsystem. Each access subsystem receives the revised list at a respective SSFC 34 where the active criteria is stored within access subsystem 12. The active filter criteria stored in service switching function control 34 is specific active criteria and filtering method associated with particular numbers.

During operation, an incoming call for a particular number is received from a local exchange 20 by access subsystem 12 at trunk call processor 36. By way of example, if the incoming call is a particular 1-800 number, trunk call processor 36 compares the incoming call to the list of intelligent network criteria stored in trunk call processor 36. In this case a match would occur because trunk call processor 36 stores 1-800 as one of its filter criteria. Trunk call processor 36 sends a trigger signal and call event information such as the number of the incoming call to service switching function control 34. Service switching function control 34 then compares the incoming number to the stored list of active filter criteria If a match occurs, then the incoming call number is transmitted by the service switching function control 34 to interconnection subsystem 14 where it is processed by the service filtering and call gaping function of processor 15.

Interconnection subsystem 14 operates as described above in connection with the second embodiment of the invention and determines whether or not the call is to be blocked or passed. This determination, i.e. call treatment instructions, are then transmitted to the service switching function control 34. If the determination is to block the call then the call is blocked by SSFC 34 and a corresponding information is sent to trunk call processor 36. However, if the determination is to pass the call, then SSFC 34 sends the information about the incoming call to SCP 22 via ADHA 32.

SCP 22 considers the call count and treatment instructions and determines how to route a particular call in response to criteria stored in SCP 22. Then SCP 22 will provide instructions to switch 10 at ADHA 32 of a particular access subsystem as to how to route the call to its end destination. This information is received at ADHA 32 and output to service switching function control 34 which passes the information onto trunk call processor 36 which connects access subsystem 10 to the particular local exchange 20 in accordance with the instructions from SCP 22.

If the incoming call does not cause trunk call process server 36 to produce a trigger signal, then the call is processed by the non-intelligent network process stored in trunk call processor 36. If the incoming intelligent network call does not match one of the active filtering criteria stored in service switching function control 34, then the call information is passed directly to the SCP 22 for routing instructions and returned to ADHA 32 of the particular access subsystem 12 with instructions to pass the call. The call is passed through service switching function control 34 to trunk call processor 36 which directs the call with the call management instructions from SCP 22 to the selected local exchange 20.

ADHA 32 passes call information to SCP 22. The information may include the calling number, the called number, and the service requested. SCP 22 considers this information and searches its tables for the type of functioning to perform on the incoming call. This may include routing the call to a number other than the 1-800 number, cause an announcement to be played to the caller, cause a busy signal to be sent to the caller or the like.

By having the SCP receive each call addressed to a particular switch system 10, along with count information for filtered calls, and causing the access subsystem to direct calls based upon call management instructions provided by the SCP 22, SCP 22 can monitor the load of entire networks including individual switching systems 10. As a result, it can monitor the load to particular numbers whether presently part of an active filter criteria or not. Furthermore, because SCP 22 can provide filter criteria and methods to be stored in interconnection subsystem 14, SCP can add or alter filtering criteria and methods as a function of monitored call load for the network. This allows a real time adjustment method and structure to control call load to prevent a system crash.

In practice, the associated filtering methods should be in place prior to the time filtering is required. Otherwise, this would require operators to program the SCP or to input filter criteria at switch system 10 twenty-four hours a day, seven days a week. Therefore, a master list is stored in interconnection subsystem 10. Therefore, when new filtering criteria and associated filtering method are input at the interconnection subsystem, they are stored in the master list along with a corresponding activation time. The activation time corresponds to the real time, (date and time) when the filtering criteria method area to be activated. For example, if a 1-800 number anticipates that it will need filtering three weeks in advance, a customer at the 1-800 number will arrange for the SCP or switch system 10 to store the activation time along with the criteria method. Processor 15 of interconnection subsystem 14 will then monitor the time and filter criteria and associated filter method as stored in the master list to cause the revision to be broadcast. At that time the filtering criteria in question becomes part of the active filtering criteria list stored in each access subsystem. The active filter criteria is a subset of the master list of filter criteria stored in the interconnection subsystem.

By utilizing a network in which the intelligent network functions are implemented in each of the access subsystems, the entire network provides a faster response because there is no need to communicate with the interconnection subsystem except for call filtering intelligent network applications. Furthermore, this does not impact the interconnection subsystem capacity and by distributing the intelligent function among all of the access subsystems, the bottle necks in the interconnection subsystem or a single access subsystem are avoided.

Similarly, by allowing the access subsystem to make the initial determination whether or not the call matches an active filtering list criterion before requesting action by the interconnection subsystem 14, the impact on the capacity of the interconnection subsystem is much lower, removing some of the bottleneck from the interconnection subsystem. Furthermore, by involving the interconnection subsystem and its management capabilities, the distribution of the filtering, because filtering occurs on a systemwide basis, is more evenly distributed and more uniformly applied than would be the case for the embodiment that implements the entire service filtering process in access subsystem 12. Furthermore, because the increment count is occurring at a central location, the interconnection subsystem, the process of collecting statistical information on filtering activity is greatly simplified.

It will thus be seen that the objects set forth above, among those made apparent from the preceding description, are efficiently attained and, since certain changes may be made in carrying out the above method without departing from the spirit and scope of the invention, it is intended that all matters contained in the above description shall be interpreted as illustrated and not in the limiting sense.

It is also to be understood that the following claims are intended to cover all of the generic and specific features of the invention herein described and all statements of the scope of the invention which, as a matter of language might be said to fall therebetween.

What is claimed is:

1. A method for filtering calls in a switch system, the switch system including at least two access subsystems and at least one interconnection subsystem comprising the steps of:

storing a list of active filtering criteria in each of said at least two access subsystems;

receiving an incoming call at at least one access subsystem of said at least two access subsystems;

determining whether the incoming call matches any of the active criteria stored in the at least one access subsystem;

applying a filtering method associated with a matched active filtering criteria if the incoming call matches any one of the active filtering criteria:

determining whether a call should be blocked as a function of said filtering method; and causing said access subsystem to block the incoming call if it is determined to block the incoming call as a function of the filtering method;

storing a list of active filtering criteria in each of said at least two access subsystems;

storing a filter method associated with each of the active filtering criteria in the interconnection subsystem;

inputting a change to the interconnection subsystem to the list of active filtering criteria and broadcasting the change to each access subsystem; and storing the change in the list of active filtering criteria in each of said at least two access subsystems.

2. The method of claim 1, further comprising the steps of at least one of said at least two access subsystem requesting information for processing said incoming call from said interconnection subsystem; and wherein said interconnection subsystem applies the filtering method associated with said incoming call and determines whether to block said incoming call as a function of said filtering method, and sends instructions to block said call to at least one said access subsystem to cause said at least one access subsystem to block said incoming call if said interconnection subsystem determines that the incoming call should be blocked as a function of the filtering method.

3. The method of claim 2 further comprising a step of counting the number of matches for each filtering criteria.

4. The method of claim 3, wherein said counting is performed by said interconnection subsystem.

5. The method of claim 1 wherein the filtering method is interval based call filtering.

6. The method of claim 1 wherein the filtering method is ratio based call filtering.

7. The method of claim 1 wherein the filtering criteria is a specific telephone number.

8. The method of claim 1 wherein the filtering criteria is a specific type of number.

9. The method of claim 1, wherein the filtering criteria is a service corresponding to a specific type of number.

10. The method of claim 1, wherein the filtering method is stored within the at least one access subsystem and the at least one access subsystem applies the filtering method to determine whether a call should be blocked as a function of the filtering method.

11. The method of claim 1, further comprising the step of storing intelligent network function information in each of said at least one of said at least two access subsystems; comparing the incoming call to the intelligent network function information to determine whether the incoming call is an intelligent network call; and performing an intelligent network function on the incoming call if it is determined that the incoming call is an intelligent network call.

12. A method for filtering calls in a switch system, the switch system including at least two access subsystems and at least one interconnection subsystem comprising the steps of:

storing a list of active filtering criteria in the interconnection subsystem;

storing a filter method associated with each of the active filtering criteria in the interconnection subsystem;

storing the list of active filtering criteria in each of said at least two access subsystems;

inputting a change to the interconnection subsystem to the list of active filtering criteria and broadcasting the change to each of said subsystems;

storing the change in the list of active filtering criteria in each of said access subsystems;

receiving an incoming call at at least one of said at least two access subsystems;

determining whether the incoming call matches any of the active criteria stored in the at least one access subsystem;

said at least one access subsystem requesting information for processing said incoming call from said interconnection subsystem when said incoming call matches one of said filtering criteria stored in said at least one access subsystem; and said interconnection subsystem applying the filtering method associated with said incoming call and determining whether to block said incoming call as a function of said filtering method, and sending instructions to block said call to at least one of said at least two access subsystems to cause said at least one access subsystem to block said incoming call if said interconnection subsystem determines that the incoming call should be blocked as a function of the filtering method.

13. The method of claim 12, wherein the filtering method is interval based call filtering.

14. The method of claim 12, wherein the filtering method is ratio based call filtering.

15. The method of claim 12, wherein the filtering criteria is a specific telephone number.

16. The method of claim 12, wherein the filtering criteria is a specific type of number.

17. The method of claim 12, wherein the filtering criteria is a service corresponding to a specific telephone number.

18. The method of claim 12, wherein said at least two access subsystems include a trunk call processor, and a service switching function control, said trunk call processor receiving said incoming call and being operatively coupled to said service switching function control and further comprising the steps of:

storing said list of active filtering criteria in said service switching function control;

storing intelligent network information in said trunk call processor;

determining whether the incoming call is an intelligent network call based on said intelligent network information, and comparing said incoming call with said active list criteria if it is determined that the incoming call is an intelligent network call.

19. The method of claim 18 wherein said filter active criteria is a subset of said intelligent network information.

20. The method of claim 12, further comprising the steps of storing a filter criteria and associated method in said interconnection subsystem;

storing the time when said filter criteria is to become an active filter criteria; and broadcasting said filter criteria to said at least two access subsystems for storage at said time.

21. The method of claim 12, further comprising a step of counting the number of matches for each active filtering criteria.

22. The method of claim 21, further comprising the step of monitoring the number of matches for each active filtering criteria and changing one of the active filtering criteria list or associated filtering method to control call load in response to the number of matches.

23. The method of claim 12, further comprising the step of storing intelligent network function information in each of said at least one of said at least two access subsystems; comparing the incoming call with the intelligent network information to determine whether the incoming call is an intelligent network call; and performing an intelligent network function on the incoming call if it is determined that the incoming call is an intelligent network call.

24. The method of claim 23 wherein at least one intelligence network function includes call filtering utilizing the active filtering criteria.

* * * * *